(No Model.) 3 Sheets—Sheet 1.
J. J. PERKINS.
COTTON HARVESTER.
No. 391,982. Patented Oct. 30, 1888.
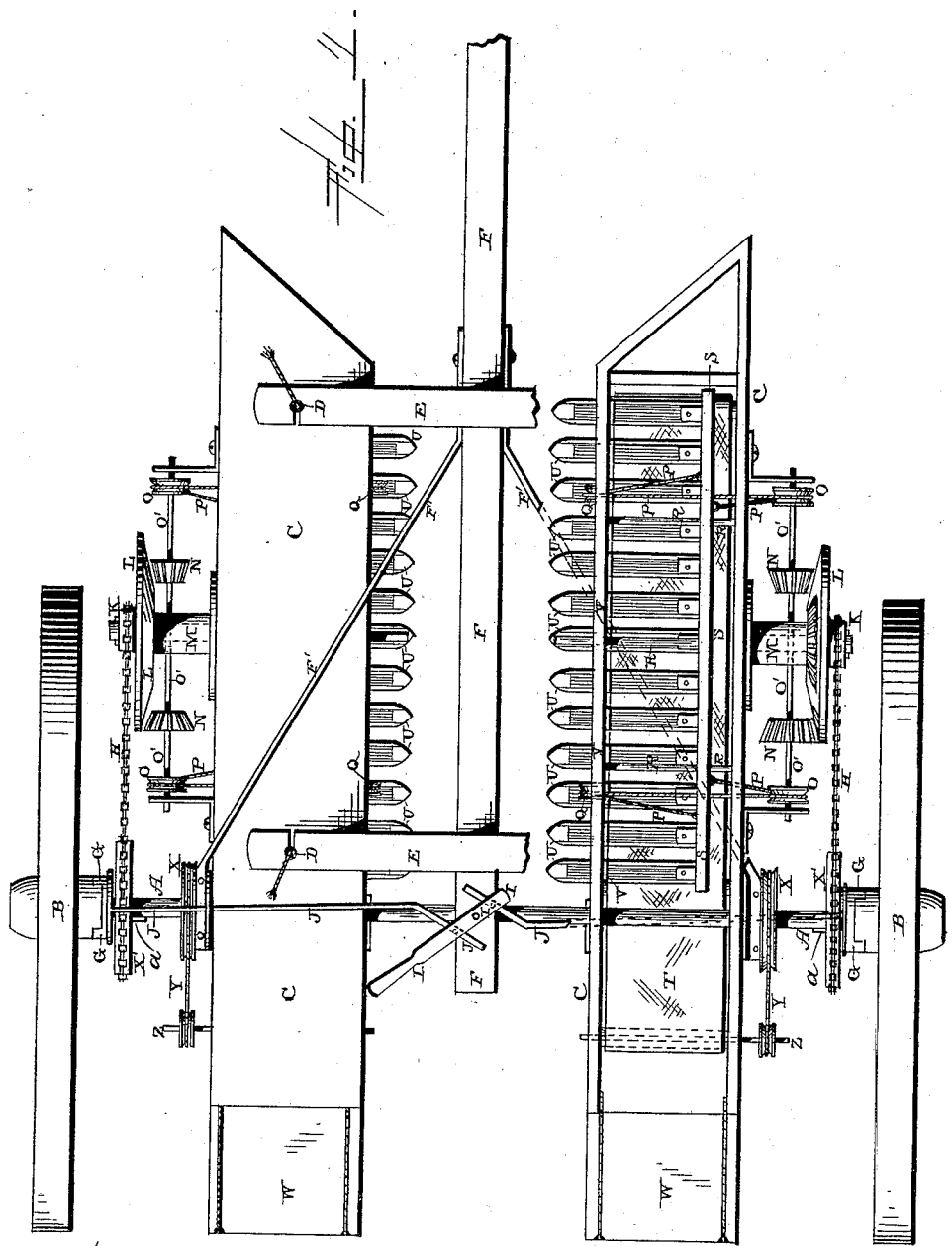

(No Model.) 3 Sheets—Sheet 2.
J. J. PERKINS.
COTTON HARVESTER.
No. 391,982. Patented Oct. 30, 1888.
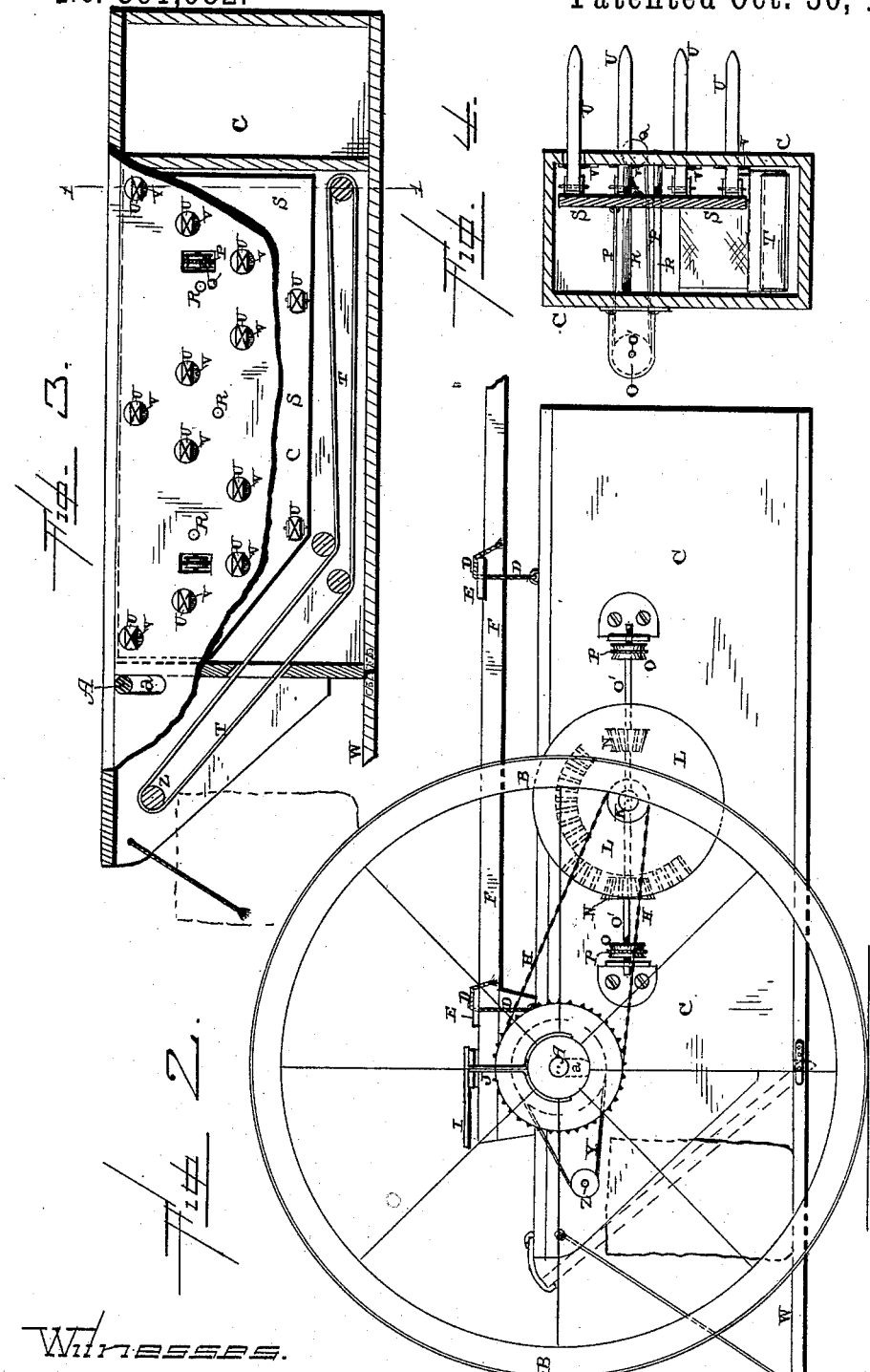

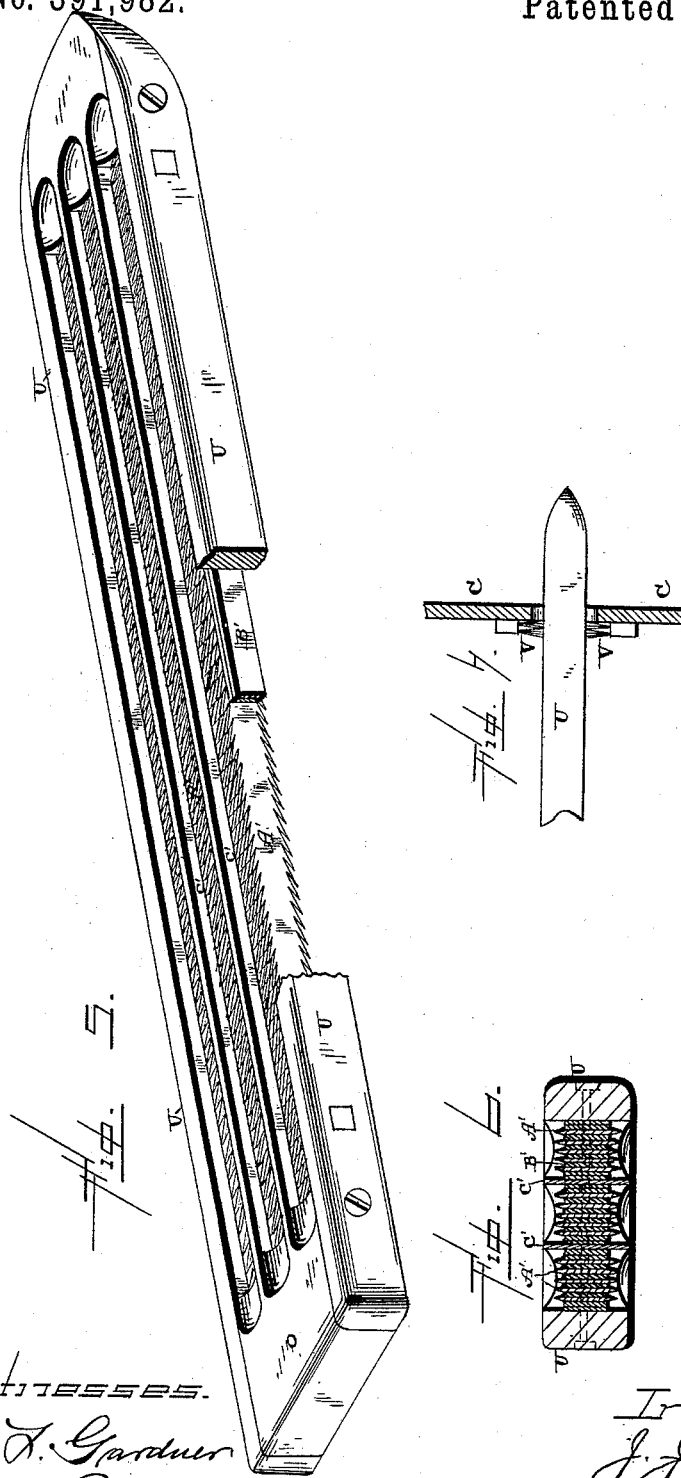

UNITED STATES PATENT OFFICE.

JAMES J. PERKINS, OF GREENVILLE, NORTH CAROLINA.

COTTON-HARVESTER.

SPECIFICATION forming part of Letters Patent No. 391,982, dated October 30, 1888.

Application filed December 1, 1887. Serial No. 256,669. (No model.)

*To all whom it may concern:*

Be it known that I, JAMES J. PERKINS, of Greenville, in the county of Pitt and State of North Carolina, have invented certain new and useful Improvements in Cotton-Harvesters; and I do hereby declare the following to be a full, clear, and exact description of the invention, such as will enable others skilled in the art to which it pertains to make and use it, reference being had to the accompanying drawings, which form part of this specification.

My invention relates to an improvement in cotton-harvesters; and it consists in the combination and arrangement of parts, which will be more fully described hereinafter.

The objects of my invention are to provide a cotton-harvester in which the butt-ends of the picker-stems are connected loosely to the stem-carrying frames, which are made to reciprocate in the compartments as the machine is drawn forward, the free ends of the picker-stems being made to pass directly through the inner sides of the compartments, and to so construct the picker-stems that the teeth are within the surfaces of their casing and separated from each other by means of spacing and guard plates, so as not to injure the growing plants.

Figure 1 is a plan view of a machine embodying my invention, the top of one of the compartments being removed, so as to show the operating parts. Fig. 2 is a side elevation of the machine. Fig. 3 is an enlarged detail view of a portion of one of the compartments and the horizontally-moving stem-carrying frame to which the picker-stems are attached. Fig. 4 is a vertical cross-section taken on the dotted line 1 1 of Fig. 3, and showing the operating parts in position. Figs. 5 and 6 are enlarged detail views of the picker-stem. Fig. 7 is a detached view showing the cleaning devices.

A represents the axle on which the driving-wheels B are loosely mounted. Placed upon this axle at a suitable distance apart are the two compartments C, which move along the opposite sides of the rows of plants, and which have their front ends beveled in the usual manner, so as to gather in all of the branches of the plants as the machine moves along, and thus hold them in a slightly-compressed form between the inner sides of the compartments for the picker-stems to operate upon. The axle passes through the rear ends of these compartments, which are provided with slots a, (shown in Figs. 2 and 3,) so as to allow them to have a vertical play independently of the axle, and the compartments are made adjustable up and down by means of the wires, chains, or cords D, which catch in slots upon the cross-plates E, which are secured at right angles to the tongue F. The compartments are thus made vertically adjustable independently of the axle, in order to adjust them to different heights of different kinds of cotton. The front ends of the compartments are supported by these wires, chains, or cords; but their rear ends when lowered are supported upon the axle. The plates E extend over the tops of the compartments, as shown, and are provided with slots or any other suitable fastenings, upon which the wires, chains, or cords are fastened, so as to hold the compartments at any desired height.

The tongue F is secured at its rear end upon the top of a block, which is placed upon the axle so as to elevate the rear end of the tongue, and the front end of the tongue is supported by the draft-animals and by the braces F', which are secured to the axle at their rear ends and which have their front ends secured to opposite sides of the tongue near its center.

Placed upon the axle A are the two sliding clutches G, provided with sprocket-wheels X'. The clutches G and the sprocket-wheels X' secured to them are feathered upon the axle A by the splines a, so as to lock the wheels to the axle and cause them to revolve the axle when they are in engagement with the drive-wheels as the machine is drawn forward. When the sprocket-wheels X' are made to revolve, they impart motion to the chain H, and through the chains H to the mechanism which operates the picker-stems. These clutches G are movable back and forth upon the axle by means of the operating-lever I, pivoted upon the rear end of the tongue F, and the shifting-rods J, connected to the lever on opposite sides of its pivot, and having their outer ends forked to catch in grooves in the clutches in the usual manner. When the clutches are not in gear with the drive-wheels, the operating mechanisms of the harvester are at rest. In the transportation of the machine to and from the field or while turning around the operating mechanism is thrown out of gear, so as to make the work easier upon the team.

The sprocket-chains H pass around the sprocket-pinions K, formed on the outer sides of the bevel-wheels L, which are journaled upon suitable bearings, M, projecting out from the sides of the compartments C. Upon the inner side of each of these bevel-wheels L are formed two sections of cogs which extend but a short distance around the wheel, and one section is placed nearer to the center of the bevel-wheel than the other and begins where the other leaves off. These cogs are arranged in two different sections and are placed at different distances from the center, because one section of cogs is intended to operate one of the pinions N in one direction and the other section the other pinion in the opposite direction. The two pinions are arranged in reverse positions upon the shaft O', and are placed at different distances from the bearings M, so that when one pinion engages with one section of the cogs upon the bevel-wheel L it drives the shaft O' in one direction, and then the other pinion engages with the other section of cogs and drives the shaft in the opposite direction. These shafts pass through the bearings M and are provided at their ends with suitable pulleys, O, around which pass the cords or chains P entirely through the compartments and around corresponding pulleys, Q, journaled in suitable bearings upon the inner sides of the compartments, as shown.

Extending horizontally through the compartments C at right angles to their length are suitable guides and supports, R, upon which the horizontally-moving stem-carrying frames S reciprocate across the compartments. The operating cords or chains P have their ends secured to opposite sides of these frames S, so that while the front pair of pinions upon the horizontal shafts O' are being caused to revolve the frames S are moved toward the outer sides of the compartments C, and when the rear pair of pinions, N, are made to revolve, the pulleys O are driven in the opposite direction and the frames are moved toward the inner sides of the compartments, so as to force the vertically-pivoted picker-stems out of the compartments into the growing plants.

The frames S are held supported in the compartments by the guides R, and are moved back and forth at a suitable distance above the bottoms of the compartments, so as not to interfere with the aprons T, which run horizontally through the bottoms of the compartments for the purpose of conveying the gathered cotton toward their rear ends. Pivoted to each of the frames S are a suitable number of picker-stems, which have their sharpened ends to project through perforations in the inner sides of the compartments. These stems are of sufficient length to extend across the compartments and project entirely through their inner sides. These picker-stems are arranged in any desired relation to each other, and are intended to be forced into opposite sides of the rows of cotton-plants, and to gather all of the ripe cotton as they make their movement. Placed inside of each of the compartments are suitable cleaning devices, V, of any suitable construction, which, as the stems are again being forced out of the compartments, sweep the cotton from them. The cotton falls upon the endless aprons in the bottoms of the compartments, is carried by them back to a suitable bag or receptacle placed to receive it upon the hinged end boards, W, which are connected to the lower rear edges of the compartments, and are supported, when dropped downward, by suitable chains, wires, or cords, as shown. The endless aprons are operated by the pulleys X, rigidly secured to the axle, and from which the cross bands or belts Y communicate motion through suitable pulleys to the shafts Z, which extend through the rear upper corners of the compartments, and on which are rollers for driving the aprons.

The picker stem consists of suitable rectangular casings, U, of suitable length, sharpened at their picking ends, so as to interfere as little as possible with the plants as they are being forced endwise into them, a series of toothed picker-plates, A', which are separated from each other by spacing-plates B', and which picker-plates are divided into a suitable number of sections by the guard-plates C'. The guard-plates C' are made of thin metallic plates, and have the same or about the same width as the thickness of the casing, and serve to act as guards to the plants, leaves, and green bolls by preventing them from coming in contact with the picker-plates A'. These toothed picker-plates A' are narrower in width than the thickness of the casings and the guard-plates C', and have their teeth all pointing toward the butt-ends of the stems, so as to gather the cotton only when the stems are being moved into the compartments. The toothed picker-plates are made narrower than the thickness of the casing and the guard-plates C', so that their teeth will be placed within the casing, and thus not be allowed to come directly in contact with the limbs, green bolls, and leaves of the growing plants. The toothed picker-plates are separated from each other by the spacing-plates B', for the purpose of leaving a suitable space between the teeth, into which the ripe cotton will sink, and thus give the teeth the chance to catch hold upon it. The guard-plates C' prevent the limbs, leaves, and green bolls from sinking down into the casing of the picker-stems sufficiently far to be caught or injured by the teeth; but they do not prevent the ripe cotton from being pressed between the guard-plates sufficiently far to be readily caught by the teeth. The ripe cotton, being very soft, readily sinks into the divisions in the casings sufficiently far to be caught by the teeth of the toothed picker-plates A'.

The casing of the picker-stem has suitable depressions at each end extending down into the recessed divisions, into which the toothed picker-plates are placed, so that the cotton will be more readily caught by the teeth than would otherwise be the case.

Having thus described my invention, I claim—

1. The combination of the axle and driving-wheels with compartments provided with slots near their rear ends for the axle to pass through, stem-carrying frames placed in the compartments and the picker-stems connected thereto and projecting through the inner sides of the compartments, and the operating mechanisms, substantially as shown, for reciprocating the stem-carrying frames, the tongue connected at its rear end to the axle above the compartments, the plates secured thereto and extending at right angles to it, and wires or chains for vertically adjusting the compartments, substantially as shown.

2. The combination of the axle, the driving-wheels, clutches placed on the axle and provided with sprocket-wheels, and the operating-chains, with bevel-wheels provided with sprocket-pinions journaled on the compartments and provided with sections of cogs upon their inner sides, the compartments, the pulleys Q, journaled in their inner sides, shafts extending along the sides of the compartments and provided with pinions to engage with the bevel-wheels, pulleys on the shafts, and cords or chains which pass around the pulleys O Q and through the compartments, and the laterally-moving stem-carrying frames, to which the ends of the cords or chains are attached, one end to each side of the frame, and the picker stems connected to the stem-carrying frames, substantially as described.

3. In a picker-stem, the combination of the casing, toothed plates of less width than the thickness of the casing and which are placed within the casing, and spacing-plates of less width than the toothed plates and which are placed between the toothed plates for the purpose of separating them, the points of the teeth of the picker-plates being within the surfaces of the casing, substantially as shown.

4. In a picker-stem, the combination of the casing, toothed picker-plates of less width than the thickness of the casing and secured therein, and guard-plates which extend parallel with the casing and which are placed between groups of the toothed plates, so as to divide them into sections, the points of the teeth of the picker-plates being within the surfaces of the casing, substantially as described.

5. In a picker-stem, the combination of the casing, toothed picker-plates of less width than the thickness of the casing and placed therein, spacing-plates of less width than the picker-plates and placed between the picker-plates, so as to separate them, and guard-plates which extend parallel with the casing and are placed between groups of toothed plates, so as to divide them into sections and protect the plants from the teeth, substantially as set forth.

6. In a cotton-harvester, the combination of the tongue and the compartments suitably supported upon the axle and having their inner sides provided with perforations, laterally-moving stem-carrying frames placed in the compartments, picker-stems vertically pivoted at their butt-ends to the stem-carrying frames and having their free ends projecting through the perforations through the inner sides of the compartments, the horizontal guides which extend through the compartments and upon which the stem-carrying frames move, the cords or chains which extend across the compartments and have their ends fastened to opposite sides of the stem-carrying frames, the operating-shaft O', provided with pinions N, reversibly placed on the shaft O', bevel-wheels having their cogs arranged in sections, driving chains for operating the bevel-wheels, and the axles provided with sprocket-wheels for operating the chains, substantially as set forth.

In testimony whereof I affix my signature in presence of two witnesses.

JAMES J. PERKINS.

Witnesses:
R. W. KING,
R. M. MOYE.